United States Patent [19]

Weis

[11] Patent Number: 5,280,484
[45] Date of Patent: Jan. 18, 1994

[54] TIME-DIVISION MULTIPLEX COMMUNICATION SYSTEM WITH A SYNCHRONIZING CIRCUIT AT THE RECEIVING END WHICH RESPONDS TO THE CODING OF WORDS INSERTED IN THE TRANSMITTED INFORMATION

[75] Inventor: Bernd Weis, Korntal, Fed. Rep. of Germany

[73] Assignee: Alcatel N.V., Amsterdam, Netherlands

[21] Appl. No.: 994,450

[22] Filed: Dec. 23, 1992

Related U.S. Application Data

[63] Continuation of Ser. No. 547,494, Jul. 2, 1990, abandoned.

[30] Foreign Application Priority Data

Jul. 8, 1989 [DE] Fed. Rep. of Germany ....... 3922486

[51] Int. Cl.$^5$ .................... H04L 5/22; H03M 13/00
[52] U.S. Cl. .................... 370/102; 370/106; 370/108; 371/37.1; 371/42
[58] Field of Search .............. 370/60, 94.1, 94.2, 370/100.1, 102, 105.1, 105.4, 106, 108, 110.1, 110.4, 111; 371/37.1, 37.6, 37.7, 37.8, 39.1, 41, 42, 43, 45, 47.1; 375/106, 112, 116

[56] References Cited

U.S. PATENT DOCUMENTS

| | | | |
|---|---|---|---|
| 3,678,469 | 7/1972 | Freeman et al. | 371/37.1 |
| 3,961,311 | 7/1976 | Pavoni et al. | 371/42 |
| 4,312,070 | 1/1982 | Coombes et al. | 371/42 |
| 4,468,770 | 8/1984 | Metcalf et al. | 371/37.1 |
| 4,486,882 | 12/1984 | Piret et al. | 371/45 |
| 4,623,999 | 11/1986 | Patterson | 371/37.8 |
| 4,635,262 | 1/1987 | Kittel | 371/42 |
| 4,755,993 | 7/1988 | Grover | 370/110.1 |
| 4,835,770 | 5/1989 | Hayano | 370/94.2 |
| 4,870,646 | 9/1989 | Maeda | 371/42 |

FOREIGN PATENT DOCUMENTS

| | | |
|---|---|---|
| 0269974 | 6/1988 | European Pat. Off. ........ H04J 3/06 |
| 3707143A1 | 9/1988 | Fed. Rep. of Germany . |
| 3735377A1 | 4/1989 | Fed. Rep. of Germany . |

OTHER PUBLICATIONS

"Error-Correcting Codes" by W. W. Peterson, MIT and John Wiley & Sons, Inc., New York, London, 1961, pp. 30–36.

*Primary Examiner*—Douglas W. Olms
*Assistant Examiner*—Alpus H. Hsu
*Attorney, Agent, or Firm*—Ware, Fressola, Van Der Sluys & Adolphson

[57] ABSTRACT

There are TDM communication systems in which synchronization is accomplished by means of code words which are transmitted at regular time intervals and coded in a particular code. In systems where the signals are transmitted in packets of uniform length, each of the code words contains the information of the so-called header of a packet. The checking device according to the invention successively checks all n-bit bit groups ($X_j$ to $X_{j+n-}$) beginning with any one ($X_j$) of the successive bits of the received bit sequence as to whether they are coded in a particular code. This is done by calculating the syndrome ($S_1$ to $S_{n-k}$) in several networks ($N_1$ to $N_{n-k}$) which operate in parallel and each of which calculates one syndrome component. The received bit sequence is delayed until the networks have calculated the syndromes for a given n-bit bit group and until a syndrome evaluation circuit (LS) indicates whether the bit group is a code word.

17 Claims, 2 Drawing Sheets

TIME-DIVISION MULTIPLEX COMMUNICATION SYSTEM WITH A SYNCHRONIZING CIRCUIT AT THE RECEIVING END WHICH RESPONDS TO THE CODING OF WORDS INSERTED IN THE TRANSMITTED INFORMATION

This is a continuation of copending application Ser. No. 07/547,494 filed on Jul. 2, 1990, now abandoned.

BACKGROUND OF THE INVENTION

1. Field of the Invention

The present invention relates to a time-division multiplex communication system comprising a transmitting device which regularly inserts an n-bit word coded in a linear block code into the bit sequence to be transmitted, and a checking device at the receiving end which looks for the n-bit word in the received bit sequence by checking groups of n successive bits as to whether they are coded in the block code.

2. Description of the Prior Art

Such a system is disclosed in DE-A1-37 35 377, wherein a so-called code word is derived from information referred to there as "header", which contains a logic channel number, and transmitted subsequent to the information. In common technical terms, the information (K) is coded in a linear block code to form a code word whose number of bits is equal to the number of bits of the information (K) augmented by the number of added bits (called "code word CW" there). The number of bits in the code word consisting of the k-bit information (K) and the added bits will hereinafter be denoted by n. In the prior art system, such code words are inserted at the transmitting end into the bit sequence at regular time intervals, namely at the beginning of each so-called packet. At the receiving end, the prior art system includes a checking device which looks for the n-bit code words in the received bit sequence. It does so by selecting a sequence of k-bits from the received bit sequence and checking whether this k-bit sequence and the subsequently received n−k bits (n−k is the number of bits added to the information K at the transmitting end) together represent a code word which is coded in the block code. If the checking device determines that the checked bit sequence is not coded in the block code, it will stop the search for the code word in the current packet and resume it in the next packet, in which it then selects a bit sequence which, referred to the beginning of the packet, begins one bit later than the bit sequence selected in the previously checked packet.

This means that considerable time may elapse until the n-bit word looked for is found in any packet. This, in turn, has the disadvantage that the synchronization of the receiver with the transmitter takes a long time, thus causing considerable information losses.

SUMMARY OF THE INVENTION

It is therefore the object of the invention to provide a time-division multiplex communication system of the above kind in which the synchronizing device at the receiving end finds the n-bit words faster, thus ensuring faster synchronization.

This object is attained by using a checking device that successively checks all n-bit bit groups which begin with any one of the successive bits of the received bit sequence.

Aside from making it possible to quickly find the n-bit words coded in the block code, the invention has the advantage that none of the parts of the check circuit requires a processing clock frequency which is higher than the bit rate of the received bit sequence. Therefore, the checking device can be implemented in CMOS technology and, thus, at low cost even at a high bit rate of 150 Mb/s. Any circuit operating at higher clock frequencies could only be implemented in a more expensive technology, e.g., ECL.

Before the invention is described with reference to the accompanying drawings, it will be briefly explained what kind of mathematical check is used to determine whether the bit group is coded in the linear block code. Such a block code is commonly referred to as an (n, k)-block code, where n is the total number of bits per block, and k is the number of information bits per block.

According to the invention, the checking of an n-bit bit group as to whether it is coded in the linear block code is done by calculating the syndrome on the basis of the parity check matrix of the linear block code used. That is not the case with the above-mentioned prior art checking device. As is well known, the syndrome, hereinafter denoted S, is a vector of dimension n−k and is calculated by multiplying the transpose of the parity check matrix H of the block code by the received block, hereinafter denoted X. Further details are described in a book by W. W. Peterson, "Error-Correcting Codes", Massachusetts Institute of Technology and John Wiley & Sons, Inc., New York, London, 1961, pp. 30–36.

The ith component of the syndrome must be calculated from an n-bit block and the transpose of the parity check matrix as the scalar product of the ith row $h_i$ and the received block X, i.e., $$S_i = h_i X = h_{i1} X_1 + h_{i2} X_2 + h_{i3} X_3 + \ldots h_{in} X_n.$$

These components of the vector S are calculated by the check circuit according to the invention for each n-bit bit group which begins with any one of the successively received bits, i.e., for the first bit of the bit sequence and the next n−1 bits, one bit period later for the second bit of the received bit sequence and the next n−1 bits, etc.

The syndrome calculation is commonly used for error detection. A given data word is examined as to whether it contains a code error, as in DE-A1 37 07 143, for example. There, the syndrome calculation is not used to find out at what point a bit sequence transmitted at a high bit rate contains a word coded in the block code. The implementation of the circuit disclosed in that publication also would be unsuitable for the present application, since it uses memories in which partial syndromes are stored, and since such a circuit, because of the memory access times and the EXCLUSIVE-OR gates following the memories, would require too long a processing time for the present application.

In the following, it will be explained with the aid of the accompanying drawings how the calculation and checking of the syndrome S are performed for each n-bit bit group beginning with a bit of the received bit sequence.

DETAILED DESCRIPTION OF THE DRAWINGS

The invention will now be explained in greater detail, by way of example, with reference to the accompanying drawings, in which.

DETAILED DESCRIPTION OF THE PREFERRED EMBODIMENTS

Figure 1:
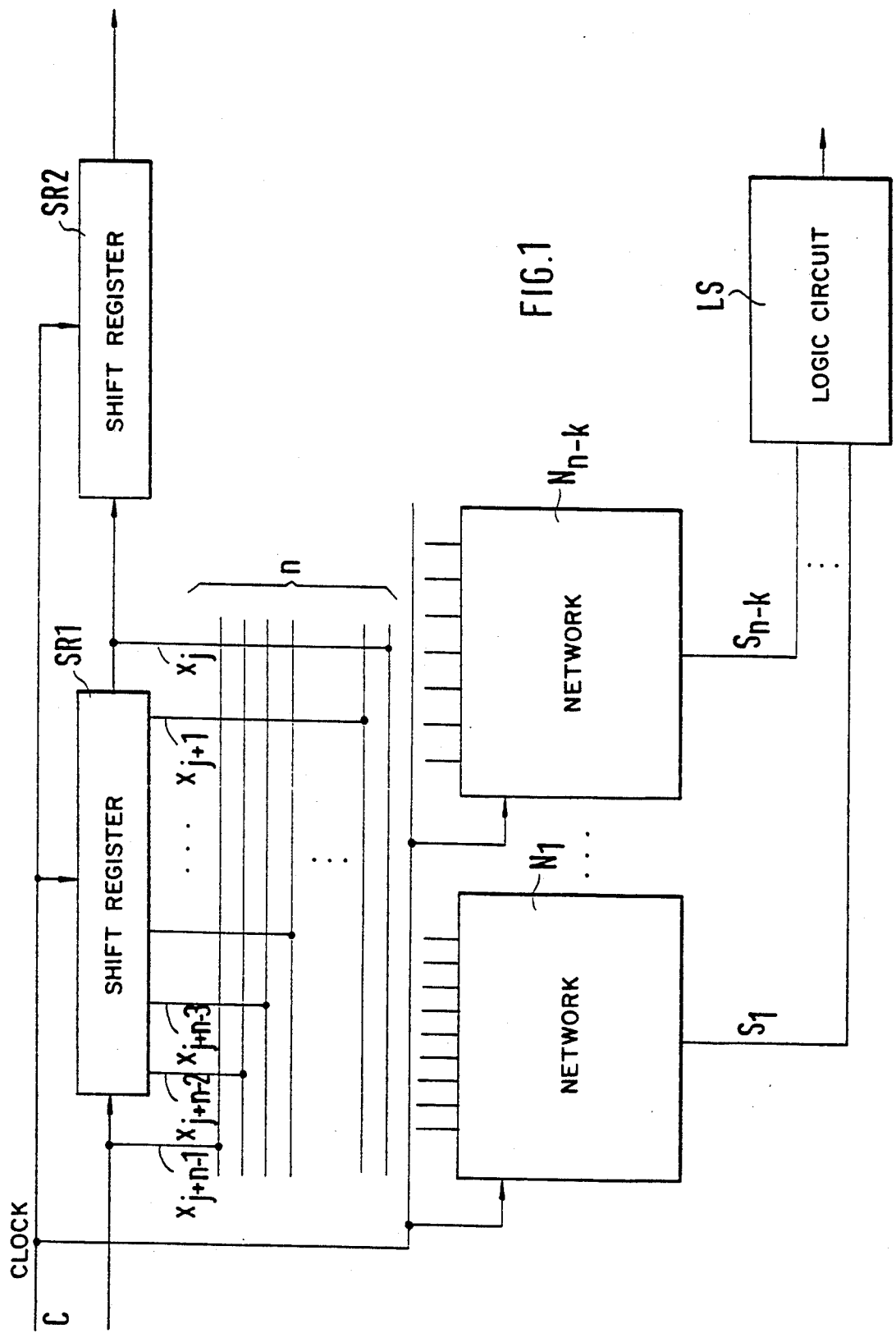
FIG. 1 is a block diagram of the checking device at the receiving end of the system according to the invention.

In the checking device shown in FIG. 1, the received bit sequence is applied to the serial input of a shift register R1 having a length of $n-1$, i.e., $n-1$ series-connected flip-flops, if the code word to be found contains n-bits. Such a shift register has $n-2$ parallel outputs, so that n successively received bits of the bit sequence are made available in parallel for further processing. If the bit appearing at the output of the shift register SR1 at any defined point of time is denoted $X_j$, the subsequent bits of the n-bit bit group beginning with the bit $X_j$ will appear simultaneously at the parallel outputs of the shift register SR1, where they are denoted $x_{j+1}$ to $X_{j+n-2}$, and at the input of the shift register SR1, with the bit appearing at the input of the shift register denoted $x_{j+n-1}$. Since the shift register is controlled by a clock signal C whose frequency is equal to the received bit frequency, the n-bit word beginning with the bit $x_{j+1}$ is made available for further processing in the next bit period.

The n-bit bit group made available for further processing in any bit period of the received bit sequence is applied in parallel to a bus designated n, of which selected conductors are connected to the inputs of networks $N_1$ to $N_{n-k}$ which are arranged and operated in parallel. For each syndrome component $S_i$ to be calculated as described above, there is one network, i.e., $n-k$ networks, because the syndrome has $n-k$ components, as mentioned above.

Of the n bits of the n-bit bit group to be checked, only those bits are entered into a network $N_i$ for which the associated value $h_{il}$ is nonzero (above equation for $S_i$). In the above equation for $S_i$, this means, for example, that in the network $N_i$, which calculates the component $S_i$ of the syndrome if the values $h_{i2}$ and $h_{i3}$ are zero, only the first, fourth, and subsequent bits of the n-bit bit group are entered, while the bits appearing in the second and third positions of an n-bit bit group, no matter what binary value they represent, are omitted. Thus, based on the parity check matrix, a particular selection of the n bits of an n-bit bit group to be checked is entered into each of the $n-k$ networks $N_1$ to $N_{n-k}$ for each component of the syndrome. The networks calculate their component of the syndrome by the above equation or $S_i$ in several stages and, as will be explained with the aid of FIG. 2, deliver their components $S_i$ of the syndrome simultaneously at their outputs, which are designated $S_1$ to $S_{n-k}$.

Since the $h_{il}$ of the parity check matrix can only have the value 0 or 1, and the additions given in the above equation are modulo-2 additions, the calculation to be performed consists of EXCLUSIVE-ORing the input bits several times, which, as is well known, yields a 1 as a syndrome component in the presence of an odd number of ones and a 0 in the presence of an even number of ones.

The EXCLUSIVE-ORing of the input bits of one of the networks, which is performed in several stages, takes place at the bit rate C of the received bit sequence. After a given number of bit periods, the syndrome for the n-bit bit group being checked is present at the outputs of the networks. Its bits pass through a logic circuit LS, which produces an output signal if the syndrome is zero (all components), thus indicating the detection of an n-bit code word.

From the output of the shift register SR1, the bit sequence is applied to the serial input of a shift register SR2, which, too, is operated at the bit rate of the bit sequence and delays the bit sequence until the networks $N_i$ have calculated the syndrome for an n-bit bit group beginning with the bit $X_j$. Thus, the first bit of a bit group will appear at the output of SR2 when the logic circuit LS indicates at its output whether this bit group is a code word or not. The logic circuit LS introduces no appreciable delay. If its delay should be too long, it may be compensated by lengthening the shift register SR2 correspondingly.

The advantage of the checking device described so far lies in the fact that it checks the received bit sequence bit by bit without any delay and does not require a processing clock frequency which is higher than the bit frequency.

Figure 2:
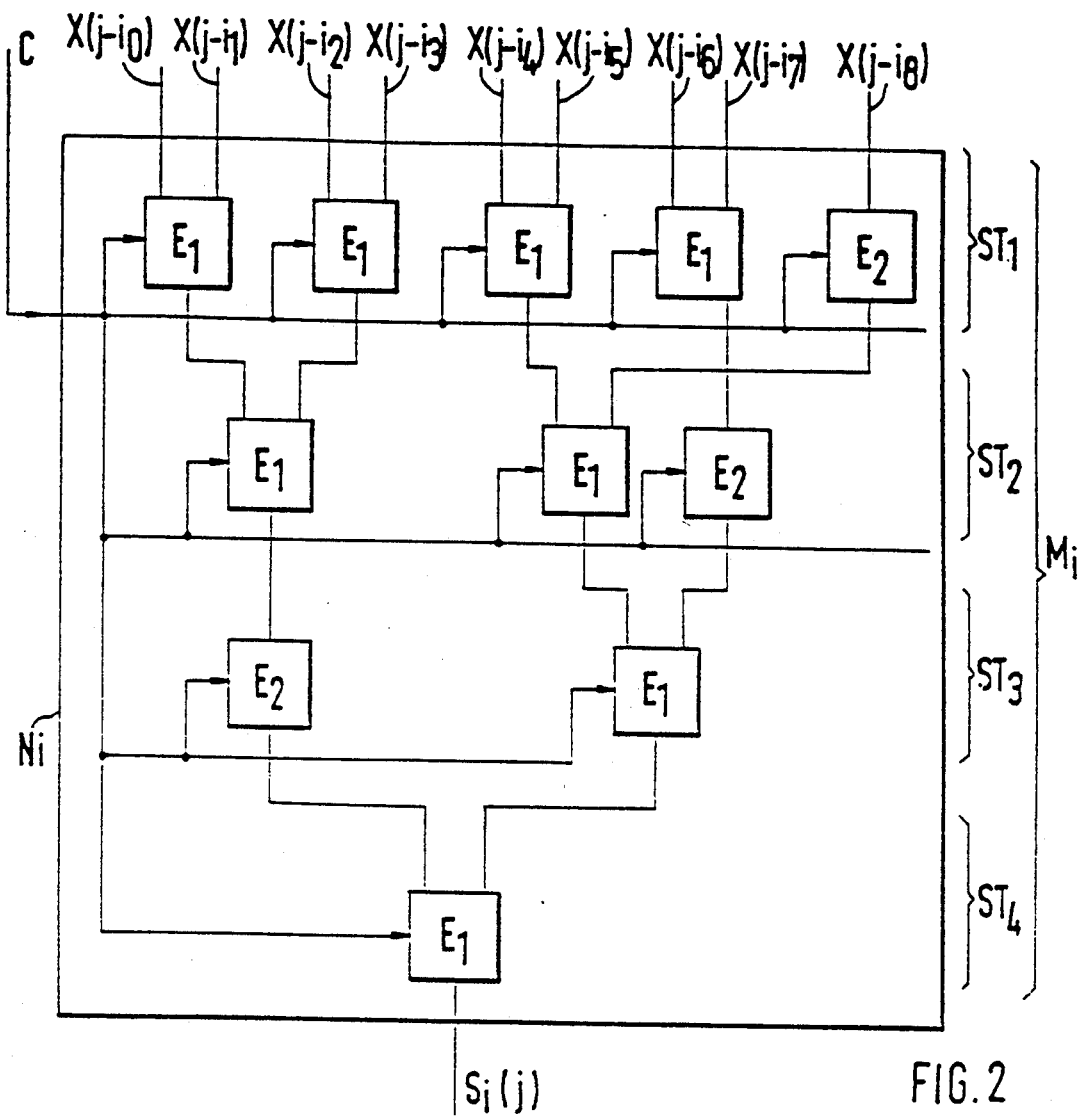
FIG. 2 shows an embodiment of one of the networks $N_1$ to $N_{n-k}$ of FIG. 1.

An embodiment of one of the networks $N_i$ of FIG. 1 will now be explained with the aid of FIG. 2. FIG. 2 shows a network $N_i$ for calculating a component $S_i(j)$ from a bit group beginning with a bit $X_j$. The example assumes that nine of the n bits of the n-bit bit group to be checked, which begins with the bit $X_j$, have to be used for calculating the component $S_i(j)$ of the syndrome. (For the other bits, the associated $h_{il}$ are nonzero). The bits to be used for the calculation are denoted at the parallel inputs of $N_i$ by $X(j-i_0)$ to $X(j-i_8)$.

In a stage $ST_1$ of $N_i$, the input bits to be summed by modulo-2 additions are combined into arbitrary pairs, with each bit permitted to occur in only one pair. In the example shown, therefore, there are four pairs and one remaining bit, because the number of bias is odd. Each pair of bits is added modulo 2 in one of network elements of a first type $E_1$ in a first clock period and stored until the next clock period. The remaining bit is stored in a network element of a second type $E_2$ until the next clock period.

Figure 3:
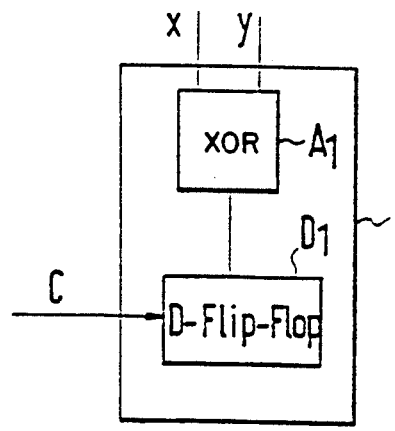
FIG. 3 shows the logic diagram of one of the elements $E_1$ of FIG. 2.
Figure 4:
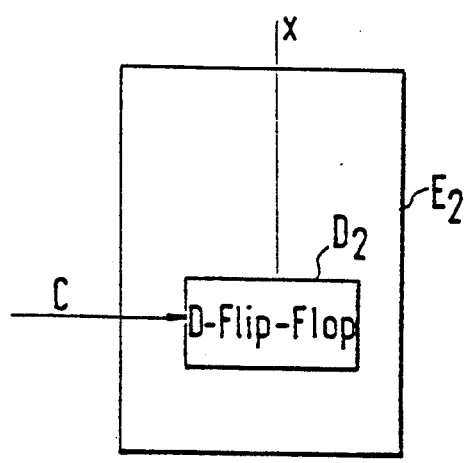
FIG. 4 shows the logic diagram of one of the elements $E_2$ of FIG. 2.

The functions of the elements of the type $E_1$ and type $E_2$ are shown in FIGS. 3 and 4, respectively. An element $E_1$ contains an EXCLUSIVE-OR gate $A_1$, which forms the EXCLUSIVE-OR of two input bits applied at the inputs x and y, i.e., adds them modulo 2, and a succeeding D flip-flop $D_1$ which stores the result until receipt of the next clock pulse. The D flip-flop is controlled by the bit-rate clock C indicated in FIGS. 1 and 2. An element $E_2$ serves to store a single bit applied at its input X in a D flip-flop $D_2$ until receipt of the next clock pulse. It is also controlled by the clock C.

After the input bits of $N_i$ have been combined in pairs and the results and the remaining input bits have been temporarily stored in the first stage $ST_1$ of $N_i$ in a first clock period, the temporarily stored results and the temporarily stored remaining bit of the stage $ST_1$ are processed in a corresponding manner in a stage $ST_2$ upon receipt of the next clock pulse. The input bits are again combined in pairs by elements $E_1$, and the remaining bit is stored in an element $E_2$. Upon receipt of the next clock pulse, the results of stage $ST_2$ are processed in a corresponding manner in a stage $ST_3$, and upon receipt of a further clock pulse, a last stage $ST_4$ calculates, in an element $E_1$, the result bit, i.e., the component $S_i(j)$ of the syndrome, from the results of stage $ST_3$. In the example shown, i.e., with nine inputs, four stages are needed, so that four bit periods after the first bit $X_j$ of an n-bit bit group beginning with this bit appeared at the output of the shift registers SR1 of FIG. 1, the network $N_i$ has calculated the component $S_i(j)$ of the syndrome of this bit group.

Each of the networks $N_i$ to $N_{n-k}$ has an individual number of input bits to be combined and a corresponding number $M_i$ of stages necessary for this purpose. In order for the entire syndrome $S(j)$ of an n-bit bit group beginning with the bit group $X_j$ to appear at the outputs of the network $N_i$ simultaneously, those networks whose necessary number of stages $M_i$ is less than the greatest $M_i$ occurring in any one of the networks have additional stages including elements of type $E_2$, so that all networks will make available their components $S_i(j)$ of the syndrome $S(j)$ at their outputs at the same instant. This instant is M bit periods later than the instant at which $X_j$ appears at the output of the shift register SR1 of FIG. 1, where M is the maximum number of stages required in any of the networks $N_i$. The delay of the shift register SR2, mentioned above in connection with FIG. 1, is thus M bit periods. Thus, the shift register SR2 delays the bit sequence until it has been decided whether a particular bit group is a code word or not.

It should be added that instead of a shift register SR1, any other memory circuit can be used to make available the n-bit bit groups to be checked. This may also be a memory in which the bits of a received bit sequence are stored other than serially provided that it is possible to output successively received bits simultaneously as one n-bit bit group.

To optimize the circuit, the networks $N_i$ may be interconnected to permit the transfer of intermediate results from one network to another, thus reducing the amount of circuit elements required.

I claim:

1. Time-division multiplex communication system comprising:
    a transmitting device which regularly encodes an n-bit word in a linear block code into a bit sequence to be transmitted, and a checking device at a receiving end which looks for the n-bit word in the received bit sequence by checking groups of n successive bits as to whether they are coded in the block code,
    wherein the checking device (SR1, SR2, $N_1$ to $N_{n-k}$, LS) checks all n-bit groups ($X_j$ to $X_{j-n-1}$) which begin with any one ($X_j$) of the n successive bits of the received bit sequence by successively checking in parallel n-bit groups and by independently checking each n-bit group.

2. A system as claimed in claim 1, wherein the checking device (SR1, SR2, $N_1$ to $N_{n-k}$, LS) calculates a syndrome ($S_1$ to $S_{n-k}$) for each of the n-bit groups ($X_j$ to $X_{j-n-1}$) on the basis of a parity check matrix of the linear block code used and, if the syndrome ($S_1$ to $S_{n-k}$) is zero, provides a signal indicating the presence of one of the n-bit words.

3. Time-division multiplex communication system comprising:
    a transmitting device which regularly encodes an n-bit word in a linear block code into a bit sequence to be transmitted, and a checking device (SR1, SR2, $N_1$ to $N_{n-k}$, LS) at a receiving end which looks for the n-bit word in the received bit sequence by checking groups of n successive bits as to whether they are coded in the block code,
    wherein the checking device (SR1, SR2, $N_1$ to $N_{n-k}$, LS) successively checks all n-bit groups ($X_j$ to $X_{j+n-1}$) which begin with any one ($X_j$) of the n successive bits of the received bit sequence,
    wherein the checking device (SR1, SR2, $N_1$ to $N_{n-k}$, LS) calculates a syndrome ($S_1$ to $S_{n-k}$) is zero, provides a signal indicating the presence of one of the n-bit words, and
    wherein the checking device (SR1, SR2, $N_1$ to $N_{n-k}$, LS) contains
        a network ($N_i$) for each component ($S_i$) of the syndrome ($S_1$ to $S_{n-k}$) which calculates one component ($S_i$) of the syndrome ($S_1$ to $S_{n-k}$) from the n-bit bit group ($X_j$ to $X_{j+n-1}$) to be checked,
        a logic (LS) which determines from the calculated components of the syndrome ($S_1$ to $S_{n-k}$) whether the syndrome ($S_1$ $S_{n-k}$) is zero, and
        a delay circuit (SR2) which delays the received bit sequence until the check of an n-bit group is completed.

4. A system as claimed in claim 3, wherein the checking device (SR1, SR2, $N_1$ to $N_{n-k}$, LS) processes the received bit sequence at the bit rate (C).

5. A system as claimed in claim 4, wherein in the checking device (SR1, SR2, $N_1$ $N_{n-k}$, LS), each bit of an n-bit bit group ($X_j$ to $X_{j+n-1}$) to be checked is fed into each of the networks ($N_i$) in parallel, and that each of the networks ($N_i$) calculates its component ($S_i$) of the syndrome ($S_1$ to $S_{n-1}$) in several successive stages by exclusive-ORing its input bits in accordance with the parity check matrix.

6. A system as claimed in claim 5, wherein the received bit sequence passes through an $(N-1)$-bit shift register (SR1) which provides an n-bit bit group ($X_j$ to $X_{j+n-1}$) to the networks ($N_1$ to $N_{n-k}$) on each pulse of the bit rate (C).

7. A system as claimed in claim 6, wherein each network ($N_i$) is fed only with those bits of the n-bit bit group ($X_j$ to $X_{j+n-1}$) for which the associated parity check matrix components to be used in the network ($N_i$) are nonzero.

8. A system as claimed in claim 7, wherein those networks ($N_i$) whose number ($M_i$) of stages ($ST_1$ to $ST_4$ is less than the maximum number of stages required in any of the networks have additional stages including delay elements ($E_2$), so that all networks ($N_1$ to $N_{n-k}$) provide their components ($S_i$) of the syndrome ($S_1$ to $S_{n-k}$) at their outputs simultaneously.

9. A method in a time-division multiplex communication system having a transmitting device which regularly encodes an n-bit word in a linear block code into a bit sequence to be transmitted, and a checking device at a receiving end, for checking for an n-bit word coded in a linear block code in a received bit sequence by checking groups of n successive bits, comprising the step of:
    checking all n-bit groups ($X_j$ to $X_{j+n-1}$) which begin with any one ($X_j$) of the successive bits in the bit sequence, by successively checking in parallel n-bit groups and by independently checking each n-bit group.

10. The method of claim 9, wherein the successively checking step comprises the steps of:
    calculating a syndrome ($S_1$ to $S_{n-k}$) for each of the n-bit bit groups on the basis of a parity check matrix of the linear block code; and if the syndrome is zero, providing a signal indicating the presence of one of the n-bit words.

11. A method for checking for an n-bit word coded in a linear block code in a bit sequence by checking groups of n successive bits, comprising the step of:

storing a selected number of bits of the bit sequence;

calculating each component of the syndrome ($S_1$ to $S_{n-k}$) from an n-bit group to be checked;

determining a magnitude from the calculated components of the syndrome;

successively and independently checking all n-bit groups ($X_j$ to $X_{j+n-1}$) which begin with any one ($X_j$) of the successive bits in the bit sequence; and delaying the received bit sequence until the check of an n-bit group ($X_j$ to $X_{j+n-1}$) is completed.

12. A checking device for a time-division multiplex communication system having a transmitting device which regularly inserts an n-bit word coded in a linear block code into a bit sequence to be transmitted, comprising:

storage means, responsive to the transmitted bit sequence, for storing the bits thereof for providing the stored bits; and checking means, responsive to selected stored bits, for checking groups of n successive bits as to whether they are coded in the block code by checking all n-bit groups ($X_j$ to $X_{j+n-1}$) which begin with any one ($X_j$) of the successive bits, by successively checking in parallel n-bit groups and by independently checking each n-bit group.

13. The checking device of claim 12, wherein the checking means calculates a syndrome ($S_1$ to $S_{n-k}$) for each of the n-bit groups on the basis of a parity check matrix of the linear block code used and, if the syndrome is zero, provides a signal indicative of the presence of one of the n-bit words.

14. A system as claimed in claim 12, wherein processing within the checking means takes place at a bit rate (C) of the received bit sequence.

15. The checking device of claim 12, wherein in the checking means, an n-bit group ($X_j$ to $X_{j+n-1}$) to be checked is fed into each of a plurality of networks ($N_i$) in parallel, and that each of the networks calculates its component ($S_i$) of the syndrome ($S_1$ to $S_{n-k}$) in several successive stages by exclusive-ORing its input bits in accordance with a parity check matrix.

16. A checking device for a time-division multiplex communication system having a transmitting device which regularly inserts an n-bit word coded in a linear block code into a bit sequence to be transmitted comprising:

storage means, responsive to the transmitted bit sequence, for storing the bits thereof for providing the stored bits;

checking means, responsive to selected stored bits, for checking groups of n successive bits as to whether they are coded in the block code by successively checking all n-bit groups ($X_j$ to $X_{j+n-1}$) which begin with any one ($X_j$) of the successive bits;

a network ($N_i$) for each component ($S_i$) of the syndrome ($S_1$ to $S_{n-k}$) which calculates one component ($S_i$) of the syndrome ($S_1$ to $S_{n-k}$) from the n-bit group ($X_j$ to $X_{j+n-1}$) to be checked;

a logic means (LS) which determines from the calculated components of the syndrome ($S_1$ to $S_{n-i}$) whether the syndrome is zero; and a delay circuit (SR2) which delays the received bit sequence until the check of an n-bit bit group is completed.

17. A checking device for a time-division multiplex communication system having a transmitting device which regularly inserts an n-bit word coded in a linear block code into a bit sequence to be transmitted, comprising:

storage means, responsive to the transmitted bit sequence, for storing the bits thereof for providing the stored bits; and checking means, responsive to selected stored bits, for checking groups of n successive bits as to whether they are coded in the block code by successively checking all n-bit groups ($X_j$ to $X_{j+n-1}$) which begin with any one ($X_j$) of the successive bits;

wherein the received bit sequence passes through the storage means comprising an (n−1)-bit shift register (SR1), which provides an n-bit bit group ($X_j$ to $X_{j+n-1}$) to a plurality of networks ($N_1$ to $N_{n-k}$) on each pulse of a bit clock (C);

wherein each network ($N_i$) is fed only with those bits of the n-bit group ($X_j$ to $X_{j+n-1}$) for which the associated parity check matrix components to be used in the network ($N_i$) are non-zero;

wherein the networks ($N_i$) whose number ($M_i$) of stages $ST_4$ to $ST_1$) is less than a maximum number of stages required in any of the networks of additional stages, including delay elements ($E_2$), so that all networks ($N_1$ to $N_{n-k}$) provide their components ($S_i$) of the syndrome ($S_1$) to $S_{n-k}$) at their outputs simultaneously.

* * * * *

UNITED STATES PATENT AND TRADEMARK OFFICE
CERTIFICATE OF CORRECTION

PATENT NO. : 5,280,484
DATED : January 18, 1994
INVENTOR(S) : B. Weis

It is certified that error appears in the above-indentified patent and that said Letters Patent is hereby corrected as shown below:

Title page, item ]57], col. 2,
In the Abstract, line 10, please change "($X_j$ to $X_{j+n-}$)" to --($X_j$ to $X_{j+n-1}$)--.

Col. 5,
Claim 1, line 11, please change "($X_j$ to $X_{j-n-1}$)" to --($X_j$ to $X_{j+n-1}$)--.

Col. 5,
Claim 2, line 4, please change "($X_j$ to $X_{j-n-1}$)" to --($X_j$ to $X_{j+n-1}$)--.

Col. 6,
Claim 3, line 15, prior to "is", please insert --for each of the n-bit groups ($X_j$ to $X_{j+n-1}$) on the basis of a parity check matrix of the linear block code used and, if the syndrome ($S_1$ to $S_{n-k}$)--; and
at line 26, please change "($S_1 S_{n-k}$)" to --($S_1$ to $S_{n-k}$)--.

Col 6,
Claim 5, line 6, please change "($S_1$ to $S_{n-1}$)" to --($S_1$ to $S_{n-k}$)--.

UNITED STATES PATENT AND TRADEMARK OFFICE
CERTIFICATE OF CORRECTION

PATENT NO. : 5,280,484
DATED : January 18, 1994
INVENTOR(S) : B. Weis

It is certified that error appears in the above-indentified patent and that said Letters Patent is hereby corrected as shown below:

Col. 6,
Claim 8, line 2, please insert a closing parenthesis after "$ST_1$ to $ST_4$".
Col. 8,
Claim 16, line 4, please add a comma after "transmitted"; and
at line 20, please change "$(S_1$ to $S_{n-1})$" to --$(S_1$ to $S_{n-k})$--
Col. 8,
Claim 17, line 25, please change "$ST_4$ to $ST_1)$" to --$(ST_1$ to $ST_4)$--.

Signed and Sealed this

Third Day of January, 1995

Attest:

BRUCE LEHMAN

*Attesting Officer*  *Commissioner of Patents and Trademarks*